United States Patent [19]

Buirley et al.

[11] 4,301,054
[45] Nov. 17, 1981

[54] THERMOGRAPHIC CHOLESTERIC COATING COMPOSITIONS

[75] Inventors: William L. Buirley, West Carrollton; Donald E. Koopman, Miami Township, Montgomery County; David B. McQuain, Dayton; William H. Reeves, Englewood, all of Ohio

[73] Assignee: Thermal Imagery, Inc., Miamisburg, Ohio

[21] Appl. No.: 45,276

[22] Filed: Jun. 4, 1979

[51] Int. Cl.³ .................. C08L 61/24; B01J 13/02; C09K 3/34
[52] U.S. Cl. .................. 260/29.4 UA; 73/356; 128/736; 252/299.7; 252/316; 428/307
[58] Field of Search .................. 252/316, 299; 106/21, 106/22; 73/356; 128/736; 260/29.4 UA

[56] References Cited

U.S. PATENT DOCUMENTS

| | | | |
|---|---|---|---|
| 3,409,404 | 11/1968 | Fergason | 252/299 X |
| 3,578,844 | 5/1971 | Churchill et al. | 252/316 X |
| 3,585,381 | 6/1971 | Hodson et al. | 252/299 X |
| 3,661,142 | 5/1972 | Flam | 73/356 |

FOREIGN PATENT DOCUMENTS

| | | | |
|---|---|---|---|
| 2536773 | 2/1977 | Fed. Rep. of Germany | 73/356 |
| 2110505 | 6/1972 | France | 73/356 |
| 2321395 | 3/1977 | France | 73/356 |
| 487923 | 1/1976 | U.S.S.R. | 252/299 |

OTHER PUBLICATIONS

Gautherie et al., "Thermographie Chloesterique", Pathologie Bilogie, Sep. 1974, pp. 554-564.
Acta Thermographica, Supplement 2, European Thermographic Association, (1978).

*Primary Examiner*—Richard D. Lovering
*Attorney, Agent, or Firm*—Jacox & Meckstroth

[57] ABSTRACT

Thermographic cholesteric coating compositions, containing cholesteric microcapsules, and coated plates are provided which give gray-red-green-blue coated temperature-responsive visual displays, over about a 3° or 4° C. range. Formulations are devised to give the displayed range, in about 1° C. intervals from about 28° C. to about 37° C. The microcapsules contain about 55% oleyl cholesteryl carbonate, about 2.0 to about 5.0% cholesteryl propionate and about 4.5 to about 7.2% of cholesteryl chloride. Coatings containing two different microencapsulated formulations, both selected within the above formulation range give thermographic plates showing a temperature-responsive visual display of seven distinct color shades, over about a 4°-7° C. range, without loss of sensitivity and without loss of noticeable color intensity.

15 Claims, No Drawings

THERMOGRAPHIC CHOLESTERIC COATING COMPOSITIONS

BACKGROUND OF THE INVENTION

Thin films of cholesteric liquid crystals have the unique property of scattering light of various colors depending on the temperature of the liquid crystal. Normally, a red color is observed at the lower end of the temperature range and the color shifts toward the blue as the film is heated. The temperature at which the red first appears and the total temperature range through which color is observed is a function of the particular compound or mixture of compounds making up the liquid crystal, including, in the latter case, the proportions of the compounds in the mixture. When such films are coated on suitable substrates, the temperature of the substrate can be determined by the color of the film. Temperature gradients of less than 0.1° C. can be resolved in this manner. This property has been utilized for a variety of applications involving thermal mapping of surfaces and energy detection.

Temperature sensitive, micro-encapsulated liquid-crystal compositions are known in the art of thermometers or thermographic plates.

The compositions in this art have included numerous cholesteryl esters.

The color-temperature response of many cholesteryl esters has been characterized. Combinations of esters may be used to measure temperatures from −20° C. to 250° C. Cholesteric substances, which have a color reaction in this range, are usually binary, tertiary, or ternary mixtures of cholesterol esters. Temperature ranges and compositions of various mixtures are used for thermal imaging. Compositions in the art have suffered from lack of reproducibility, sensitivity, precision accuracy and brightness, in part because there was no appreciation in the art of the important parameters of component purity, capsular size and capsular size distribution which affected packing densities resulting in poor calibration.

BRIGHTNESS

The brightness of the composition of this invention, in part, can be attributed to purity of initial materials (cholesteric esters), as well as to the extreme attention given to detail during encapsulation so that the end resulting composition is capable of providing a uniform wall covering, not only in wall thickness, but also in uniformity of the composition. In addition, a minimum free wall material (free colloid) is produced during the encapsulation procedure. This reduces the amount of non-active material in the final coating, as well as reducing non-capsular specular reflections.

In part, brightness of the composition can also be attributed to the production of a narrow range of capsule sizes, 30 to 50 microns, contrasted to the usual wide range of 5 microns to 100 microns in prior art.

Packing densities with respect to our narrow range of capsule sizes approaches six-fold, giving rise to maximum coverage (minimum voids). With the wide range of capsular sizes found in the prior art, closest packing is not possible, and packing discontinuities will exist, thus causing specular reflection and reduced brightness.

In the prior art, precision, accuracy and sensitivity of a thermal response is affected by the wide variation in capsule sizes present in an encapsulated liquid crystal film. The thermal response of each capsule is unique, with each capsule responding as a thermal unit independent of the surrounding capsules. A 5 micron capsule requires less thermal energy to cause a transition than is required by a large 100 micron capsule. In an uncontrolled widely varying mixture of capsule sizes the visual response is definitely less precise due to a multiplicity of reflected wavelengths resulting in poor resolution. By way of contrast a narrow range of capsule sizes results in better precision and accuracy, with increased brightness and resolution.

The heat sink characteristics of the wall material are different from those of thermally active liquid crystal core materials. In the prior art the capsules have been produced with a disparity of capsule size and shape and the wall deposition with respect to core material is greater on small capsules than larger capsules. A careful control of the capsule size and wall deposition is necessary to produce a film with capsules, having a total uniform thermal mass.

In the prior art, cholesteric oils have normally been microencapsulated using clustered aggregates instead of single oil droplets. By following the preferred method of encapsulation of this invention, single oil droplets are produced which are surprisingly much brighter than any other known microencapsulated cholesteric system.

Single oil drops fit nicely into a six-fold coordination, and the narrow size range of the capsules allows more nearly perfect packing densities, whereas wide size ranges or cluster aggregates of capsules cause more light scattering because of less dense packing, and increase the probability of packing discontinuities.

Because of the increased brightness of the microencapsulated cholesteric material in this invention, the contrast between adjacent colors produces surpringly sharp isotherm boundaries which allow extremely accurate temperature measurement.

To exemplify this increased brightness, the second order color (gray) usually not seen in prior art materials, is useable as a distinct contrast band, and its boundaries are useable as accurate isotherms. Thus, the number of useable accurately known isotherms is increased, thereby increasing the temperature range without sacrificing sensitivity.

With the use of contrast band boundaries as the accurate isotherms, it is possible to determine the intermediate temperatures not located on the isotherm with the same accuracy by linear interpolation without regard to color hue or shading.

It is an object of this invention to provide temperature-sensitive, thermographic compositions which give precise temperature-dependent color changes with excellent reproducibility, sensitivity, precision and brightness of display.

It is a further object of this invention to provide thermographic compositions and plates that respond visually to temperature changes of about 1° C. or less over a wide range of up to about 7 centigrade degrees.

The thermographic compositions and plates of this invention have met the objects of this invention.

The thermographic compositions of this invention comprise mixtures of cholesteryl esters as the core material of microcapsules having transparent or translucent walls. Preferably, the microcapsule wall material is polymeric film material such as gelatin or urea-formaldehyde polymer material, with the former being preferred. When the microcapsule wall material is to be gelatin, the method of encapsulation disclosed in U.S.

Pat. No. 2,800,457 (B. K. Green and L. Schleicher) is used. For microcapsules having urea-formaldehyde polymer wall material, the method of United States 4,001,140, particularly, Example 1 thereof, (P. L. Foris, R. W. Brown and P. S. Phillips, Jr.) is advantageously used.

The thermographic core material of the microcapsules used in the composition of this invention is a mixture of cholesteryl pelargonate, oleyl cholesteryl carbonate, cholesteryl propionate and cholesteryl chloride. sitions the pelargonate:oleyl carbonate ratio is systematically increased in regular increments from about 3.02 to about 5.06. A series of compositions can be prepared, varying in one centigrade degree increments (or less if desired) from a 31° C. composition to a 37° C. composition. Particularly useful compositions of this type (having about 88% pelargonate and oleyl carbonate content and a gray-blue color transition range width of about 4 centigrade degrees) can be made by the microencapsulation of core materials of the following formulations:

| | Middle-Green Temperature | Pelargonate: Oleyl Carbonate | Pelargonate (%) | Oleyl Carbonate (%) | Propionate (%) | Chloride (%) |
|---|---|---|---|---|---|---|
| (1) | 30° | 3.07 | 66.4 | 21.6 | 5.5 | 6.5 |
| (2) | 31° | 3.02 | 66.5 | 22.0 | 4.6 | 6.9 |
| (3) | 32° | 3.35 | 68.0 | 20.3 | 4.7 | 7.0 |
| (4) | 33° | 3.82 | 70.0 | 18.3 | 4.7 | 7.0 |
| (5) | 34° | 4.10 | 71.0 | 17.3 | 4.7 | 7.0 |
| (6) | 35° | 4.66 | 72.7 | 15.6 | 4.7 | 7.0 |
| (7) | 36° | 4.88 | 73.2 | 15.0 | 5.4 | 6.4 |
| (8) | 37° | 5.06 | 73.4 | 14.5 | 5.6 | 6.5 |

The point at which a readily-observable temperature-dependent color change in the composition occurs can be varied by varying the proportion of the four cholesteryl derivatives in the core material mixture. In all cases, the inventive compositions, contain major amounts of cholesteryl pelargonate and oleyl cholesteryl carbonate, and minor amounts of cholesteryl propionate and cholesteryl chloride. In general, core material mixtures having a higher perlargonate: oleyl carbonate ratio give useful temperature-dependent color changes at higher temperatures, provided the total amount of pelargonate and oleyl carbonate in the mixture remains constant.

The compositions of this invention give a regular series of more-or-less evenly-spaced color changes of gray to red to green to blue over a total range of 3 to 4 centigrade degrees for use in measuring surface temperature of the human body, normal and pathological. Compositions showing gray-red-green-blue color changes in the range of about 27° to about 37° C. are useful. For the purposes of this discussion, temperatures creating a response in the middle of the green color range are used herein to designate the "temperature" of the composition. Thus a composition which is gray at 28° C. and blue at 32° C. will be designated a "30° C. composition", that being the middle of the central green range. The thus-described 30° C. may be seen to have a 4° C. transition color range or width from gray through blue. Although the gray to red color transition is useful, the more useful red-green-blue range, of about 3° C. transition which, is often used to characterize the described composition as having a 3° C. transition width.

It has been found that four-part cholesteryl mixtures (pelargonate, oleyl carbonate, propionate and chloride) having a pelargonate plus oleyl carbonate content of about 88% give a complete gray-red-green-blue color transition over a range of about 4 centigrade degrees. Increasing the total pelargonate plus oleyl carbonate content of the mixture narrows the total color transition range to a width of about 3 centigrade degrees. Narrowing the width of the color transition range increases the sensitivity of the composition to temperature changes within the range.

Taking compositions having a pelargonate plus oleyl carbonate content of about 88%, a series of compositions may be selected having color transitions ranges between about 27° C. and 39° C., if within these compo- As can be appreciated from the above discussion, the 30° C. composition from the above formulation table will turn gray at about 27.5° C. and, in terms of the central point of each of the transitional color bands, will be gray at about 28° C., red at about 29° C., green at about 30° C. and blue at about 31° C.

A special feature of this invention is directed to compositions comprising preferably about equal parts of two of the microencapsulated core material formulations, chosen with a 3° increment, so as to give over-lapping ranges with a total color transition width of about 7 centigrade degrees. However, satisfactory compositions have been obtained with unequal parts up to a ratio of 70-30, without significant loss of brightness. Thus one part of microencapsulated core material of the 30° composition, No. 1, mixed with one part of microencapsulated core material of the 33° composition, No. 4, gives a composition showing regular color changes, in response to temperature changes from about 27.5° C. to about 34° C. The partial over-lapping of the two color transition ranges of the 30° C. composition and the 33° C. composition gives rise to seven readily-distinguishable color changes: alpha gray, beta red, beta green, beta blue, gamma red, gamma green and gamma blue. The beta hues are predominantly derived from the lower-range composition, namely the 30° C. composition in this case, and the gamma hues are predominantly derived from the higher-range composition, that is the 33° C. composition in this case. The alpha gray is the gray of the 30° C. composition. The beta hues are the primary hues of the 30° C. composition, shaded by the appearance of the gray and red of the 33° C. composition. The gamma hues are the primary hues of the 33° C., shaded by the blue of the 30° C. composition. The beta hues are readily distinguished from the gamma hues such that the entire color transition range gives seven readily recognized colors in response to temperature variations over about a 7-degree range.

Similarly useful mixtures, exhibiting a 7-degree color transition range, but operating at higher temperatures can be made with equal parts of the following compositions: (from the above formulated table)

Nos. (2) and (5), Nos. (3) and (6), Nos. (4) and (7), and Nos. (5) and (8).

For greater sensitivity to small temperature changes, compositions having a narrower color transition range are made with a pelargonate plus oleyl carbonate content of about 92 to 93%. Compositions in this formulation range have a color transition range width of about 2 centigrade degrees for the red to green to blue transition, or about 3 centigrade degrees for the total gray through blue transition. If the pelargonate:oleyl carbonate ratio is systematically increased in regular increments from about 1.72 to about 2.53, a series of seven compositions, containing 92 to 93% pelargonate plus oleyl carbonate, can be prepared, varying in one-degree increments (or less, if desired) from about 29° C. to 35° C.:

| | Middle-Green Temperature | Pelargonate: Oleyl Carbonate | Pelargonate (%) | Oleyl carbonate (%) | Propionate (%) | Chloride (%) |
|---|---|---|---|---|---|---|
| (9) | 29° | 1.72 | 58.5 | 33.9 | 2.4 | 5.2 |
| (10) | 30° | 1.93 | 60.7 | 31.5 | 2.4 | 5.4 |
| (11) | 31° | 1.94 | 61.2 | 31.5 | 2.5 | 4.8 |
| (12) | 32° | 2.03 | 62.2 | 30.7 | 2.1 | 5.0 |
| (13) | 33° | 2.17 | 63.5 | 29.2 | 2.2 | 5.1 |
| (14) | 34° | 2.40 | 65.3 | 27.2 | 2.6 | 4.9 |
| (15) | 35° | 2.53 | 66.3 | 26.2 | 2.6 | 4.9 |

Here, mixing of equal parts of related formulations, after separate microencapsulation thereof, having overlapping color transitions ranges can be effected to give compositions having a beta red to gamma blue transition width of about 3.5 centigrade degrees, or a width of about 4 centigrade degrees, for all of the alpha gray-gamma blue transitions. From the above formulation table, particularly useful compositions are obtained by mixing formulation Nos. 9 and 11, Nos. 10 and 12, Nos. 11 and 13, Nos. 12 and 14, and Nos. 13 and 15.

The various formulations set out in the tables above, and variations thereon which the artisan can readily derive from the teachings of this disclosure, are useful as visual temperature indicators when applied to a surface such as the human skin. The formulations are advantageously used as the core material in microcapsules, having substantially transparent or translucent polymeric wall material. The microcapsule, containing one of the thermographic formulations, either separately or mixed with microcapsules containing a second of the thermographic formulations, are most useful when coated onto a substrate sheet material.

In practice, a substrate, preferably a transparent film, particularly a Mylar-type polyester film is coated with the described microcapsules, each of which contains, as core material, a micro-droplet of a cholesteric formulation, as set out in the tables above.

A preferred microcapsule coating slurry is prepared by mixing:
  121 grams aqueous microcapsule slurry (56.1% solids)
  136 grams of a 10% polyvinyl alcohol (Elvanol 71-30, E. I. DuPont, Wilmington, Delaware)
  6 grams of distilled water
  2 grams of a 1% aqueous solution of alkylaryl polyether alcohol wetting agent, (Triton X-100, Rohm & Haas, Philadelphia, Pa.).

Elvanol 71-30 is a medium viscosity, fully hydrolyzed grade of polyvinyl alcohol which is white and granular, and soluble in hot water, but insoluble in cold water and common organic solvents. For many applications "Elvanol 71-30" is prepared in water solutions. On evaporation of water, transparent films are formed which have high tensile strength and tear resistance. The binder characteristics of "Elvanol" offer excellent adhesion to porous, water absorbent surfaces.

The polyvinyl alcohol used in this example was "Elvanol 71-30", as sold by E. I. DuPont de Nemours & Co., Inc., Wilmington, Del., U.S.A. and was characterized in that (a) 4%, by weight, aqueous solution of the material exhibited a viscosity of 23 to 28 centipoises at 25 degrees centigrade, and (b) the material was 97.7 to 98.4% hydrolyzed; i.e., that specified percentage of acetate or other chemical groups originally present in molecules of the subject material had been converted to hydroxyl groups.

The coating slurry can be applied to the selected substrate by any of the many coating methods. Best results are obtained using a silk screen, knife coater or smooth bar coater. The latter two methods are preferred.

The coating slurry is preferably applied at a wet coating thickness of 6 to 12 mils, preferably about 10 mils. The coated substrate is air-dried, optionally with the use of blowers, and heated to a maximum of 60° C. The coated substrate is then ready for the application of a non-transparent overcoat.

For preparing a non-transparent overcoat, carbon black is added to the chosen binder material to give about 10–20% solids, and coated onto the dried microcapsular coat at about 4 to 10 mils, preferably about 8 mils, wet thickness, and air dried.

The preferred non-transparent overcoat is of the formula:
  About 53.4% of a styrene-acrylic latex, Ucar-4341, 45% solids, Union Carbide Corp., 270 Park Avenue, New York, N.Y. 10017.
  About 26.6% aqueous carbon black, 35% solids (Aqua Black-135, Borden Chemical).
  About 20% Polyvinyl alcohol 71-30, 10% solution, DuPont.

For application to curved or irregular surfaces, such as a knee joint, the substrate is preferably flexible and somewhat elastic.

Particularly useful flexible substrates are films of polyurethane, such as the polyurethane film sold under the trademark "Korel" by Norwood Industries, Inc., 100 North Morehall Road, Malvern, Pa. 19355, in 1 and 2 mil thicknesses. The substrate sheet material may be transparent or opaque. Even natural latex films or paper can be used.

Among the more useful flexible binders for holding the microcapsules on the substrate are polyurethane latexes, such as those sold under the trademarks "A-2701-4" by Hughson Chemical, Erie, Pa., "Desmocal E-471" and "E-723" byMobay Chemical Corporation, Pittsburg, Pa., and "Hooker 2050-L", "2030" and "2060" by Hooker Chemical Corporation, Hicksville, N.Y. The preferred flexible binder latex is "Desmocal E-723".

In practice, a substrate, preferably a transparent film, particularly a polyurethane film is coated with the described microcapsules, each of which contains, as core material, a micro-droplet of a cholesteric formulation, as set out in the tables above. A microcapsular coating slurry specifically for flexibility is prepared by mixing:

121 grams aqueous microcapsule slurry (56.1% solids)

34 grams of a 40% polyurethane latex (Desmocal E-723)

6 grams of distilled water 2 grams of a 1% aqueous solution of alkylaryl polyether alcohol wetting agent, (Triton X-100, Rohm and Haas, Philadelphia, Pa.).

The coating substrate may be applied to the test surface, preferably with the substrate side next to the test surface. The temperature, and temperature variations, existing over both space and time, can then be read by visually observing the colors exhibited over the coated substrate surface. If the substrate film is non-transparent, the thermographic sheet or plate is observed at the perpendicular (about 90°) from the coated side. If the substrate sheet is transparent, the exhibited colors may be observed from either side at the perpendicular. It is preferred to use a transparent substrate sheet with the microcapsular coat bearing a film overcoat, such that the microcapsular coat is sandwiched between the transparent substrate and the overcoat. The overcoat is also useful with non-transparent substrate sheets, but then the overcoat must be transparent. A preferred non-transparent substrate sheet is a polyurethane sheet, containing an effective amount of carbon black such as Korel 4386-10 (Norwood Industries, Inc., 100 North Morehall Road, Malvern, Pa. 19355). When a transparent substrate sheet is used, the overcoat is preferably non-transparent, particularly containing an effective amount of carbon black.

A suitable transparent overcoat is obtained by coating the dried microcapsule coat with an elastic binder material, such as polyurethane of the same composition as that used in the microcapsule coat. For preparing a non-transparent overcoat, carbon black is added to the chosen binder material to give about 10-20% solids, and coated onto the dried microcapsular coat at about 4 to 10 mils, preferably about 8 mils, wet thickness, and air dried.

For a flexible substrate a preferred non-transparent, flexible overcoat is the of the formula:

About 75% polyurethane latex (Desmocal E-723, Mobay Chemical Corporation)

About 25% aqueous carbon black, Aqua Black-135, 35% solids, Borden Chemical Company, Canden, N.J.

The preferred method of calibration of the system is specifically documented in the Food and Drug Administration 510(k) Notification No. K780478, as amended (Liquid Crystal Thermographic System).

Throughout this disclosure, percents are percents by weight, and temperature is expressed in degrees centigrade.

Although the preferred embodiment of the composition and process have been described, it will be understood that within the purview of this invention various changes may be made in the form, proportion and ingredients and the combination thereof, which generally stated consist in a method and a composition capable of carrying out the objects set forth, as disclosed and defined in the appended claims.

We claim

1. An aqueous coating composition comprising:
   (a) a polymeric, film-forming binder material and
   (b) microcapsules having transparent wall material, and having core material consisting essentially of about 55 to about 75% of cholesteryl pelargonate, about 14 to about 35% of oleyl cholesteryl carbonate, about 2.0 to about 6.0% of cholesteryl propionate and about 4.5 to about 7.2% of cholesteryl chloride.

2. The aqueous coating composition of claim 1, wherein the microcapsules are single-droplet microcapsules of uniform size.

3. The aqueous coating composition of claim 2 in which the microcapsules are 30 to 50 microns in average diameter.

4. The coating composition of claim 1, wherein the core material consists essentially of about 65–75% cholesteryl pelargonate, about 14–22% oleyl cholesteryl carbonate, about 4.5–6.0% cholesteryl propionate and about 6.2–7.2% cholesteryl chloride.

5. The coating composition of claim 4, comprising about equal parts of two kinds of microcapsules, differing in core material compositions, wherein the first kind of microcapsules has core material about 2.4 to about 4.7% richer in cholesteryl pelargonate and about 3.3 to about 4.7% poorer in oleyl cholesteryl carbonate than the core material of the second kind of microcapsule.

6. The coating composition of claim 1, wherein the core material consists essentially of about 55–67% cholesteryl pelargonate, about 25–35% oleyl cholesteryl carbonate, about 2.0–2.8 cholesteryl propionate and about 4.5 to 5.5 cholesteryl cloride.

7. The coating composition of claim 6, comprising about equal parts of two kinds of microcapsules, different in core material compositions, wherein the first kind of microcapsule has core material about 1.5 to about 3.1% richer in cholesteryl pelargonate and about 0.8 to about 3.5% poorer in oleyl cholesteryl carbonate than the core material of the second kind of microcapsule.

8. The coating composition of claim 1, wherein the binder material is polyvinyl alcohol and the microcapsule wall material is urea-formaldehyde resin.

9. The coating composition of claim 4 wherein the selected microcapsule core material composition is one or two of the following:

| | % Cholesteryl Pelargonate | % Oleyl Cholesteryl Carbonate | % Cholesteryl Propionate | % Cholesteryl Chloride |
|---|---|---|---|---|
| (a) | 66.4 | 21.6 | 5.5 | 6.5 |
| (b) | 66.5 | 22.0 | 4.6 | 6.9 |
| (c) | 68.0 | 20.3 | 4.7 | 7.0 |
| (d) | 70.0 | 18.3 | 4.7 | 7.0 |
| (e) | 71.0 | 17.3 | 4.7 | 7.0 |
| (f) | 72.7 | 15.6 | 4.7 | 7.0 |
| (g) | 73.2 | 15.0 | 5.4 | 6.4 |
| (h) | 73.4 | 14.5 | 5.6 | 6.5 |

10. The coating composition of claim 9 wherein the selected microcapsule core material is one of compositions (b), (c), (d), (e), and (f).

11. The coating composition of claim 9 wherein two microcapsule core materials are used in about equal portions, selected as follows: (a) and (d), (b) and (e), (c) and (f), (d) and (g) or (e) and (h).

12. The coating composition of claim 9 wherein two microcapsule core materials are used in unequal portions, up to a 70-30 ratio selected as follows: (a) and (d), (b) and (e), (c) and (f), (d) and (g) or (e) and (h).

13. The coating composition of claim 7 wherein the selected microcapsule core material is one or two of the following:

|     | % Cholesteryl Pelargonate | % Oleyl Cholesteryl Carbonate | % Cholesteryl Propionate | % Cholesteryl Chloride |
|-----|---------------------------|-------------------------------|--------------------------|------------------------|
| (a) | 58.5                      | 33.9                          | 2.4                      | 5.2                    |
| (b) | 60.7                      | 31.5                          | 2.4                      | 5.4                    |
| (c) | 61.2                      | 31.5                          | 2.5                      | 4.8                    |
| (d) | 62.2                      | 30.7                          | 2.1                      | 5.0                    |
| (e) | 63.5                      | 29.2                          | 2.2                      | 5.1                    |
| (f) | 65.3                      | 27.2                          | 2.6                      | 4.9                    |
| (g) | 66.3                      | 26.2                          | 2.6                      | 4.9                    |

14. The coating composition of claim 13, wherein two microcapsule core materials are used in about equal portions, selected as follows: (a) and (c), (b) and (d), (c) and (e), (d) and (f) or (e) and (g).

15. The coating composition of claim 13, wherein two microcapsule core materials are used in unequal portions, up to a 70-30 ratio, selected as follows: (a) and (c), (b) and (d), (c) and (e), (d) and (f) or (e) and (g).

* * * * *

UNITED STATES PATENT AND TRADEMARK OFFICE
CERTIFICATE OF CORRECTION

PATENT NO. : 4,301,054
DATED : November 17, 1981
INVENTOR(S) : William L. Buirley, Donald E. Koopman, David B. McQuain, and William H. Reeves It is certified that error appears in the above-identified patent and that said Letters Patent are hereby corrected as shown below:

Column 3, line 30, change "perlargonate" to ---pelargonate---.

line 52, change "which" to ---width---.

Signed and Sealed this

Ninth Day of February 1982

[SEAL]

Attest:

GERALD J. MOSSINGHOFF

Attesting Officer     Commissioner of Patents and Trademarks